May 13, 1952     D. J. BAKER     2,596,519
DISTANCE COMPARATOR GAUGE
Filed Sept. 28, 1944     2 SHEETS—SHEET 1
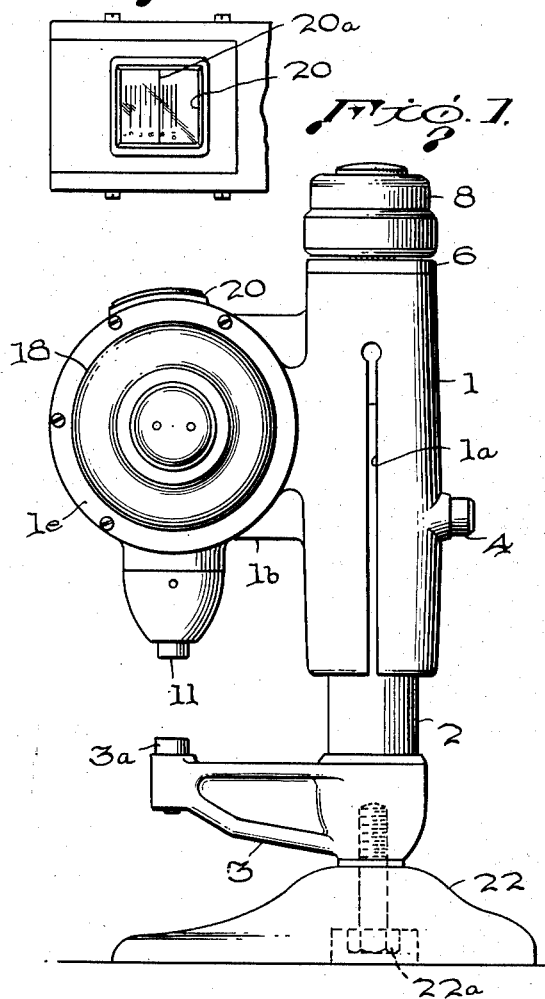
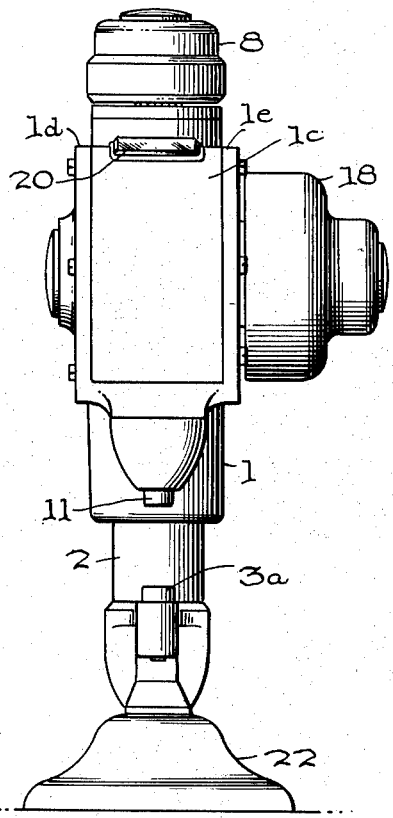
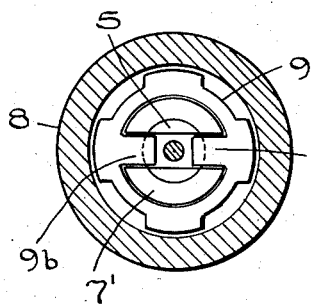
Inventor
DONALD J. BAKER
By Ralph B. Stewart
Attorney

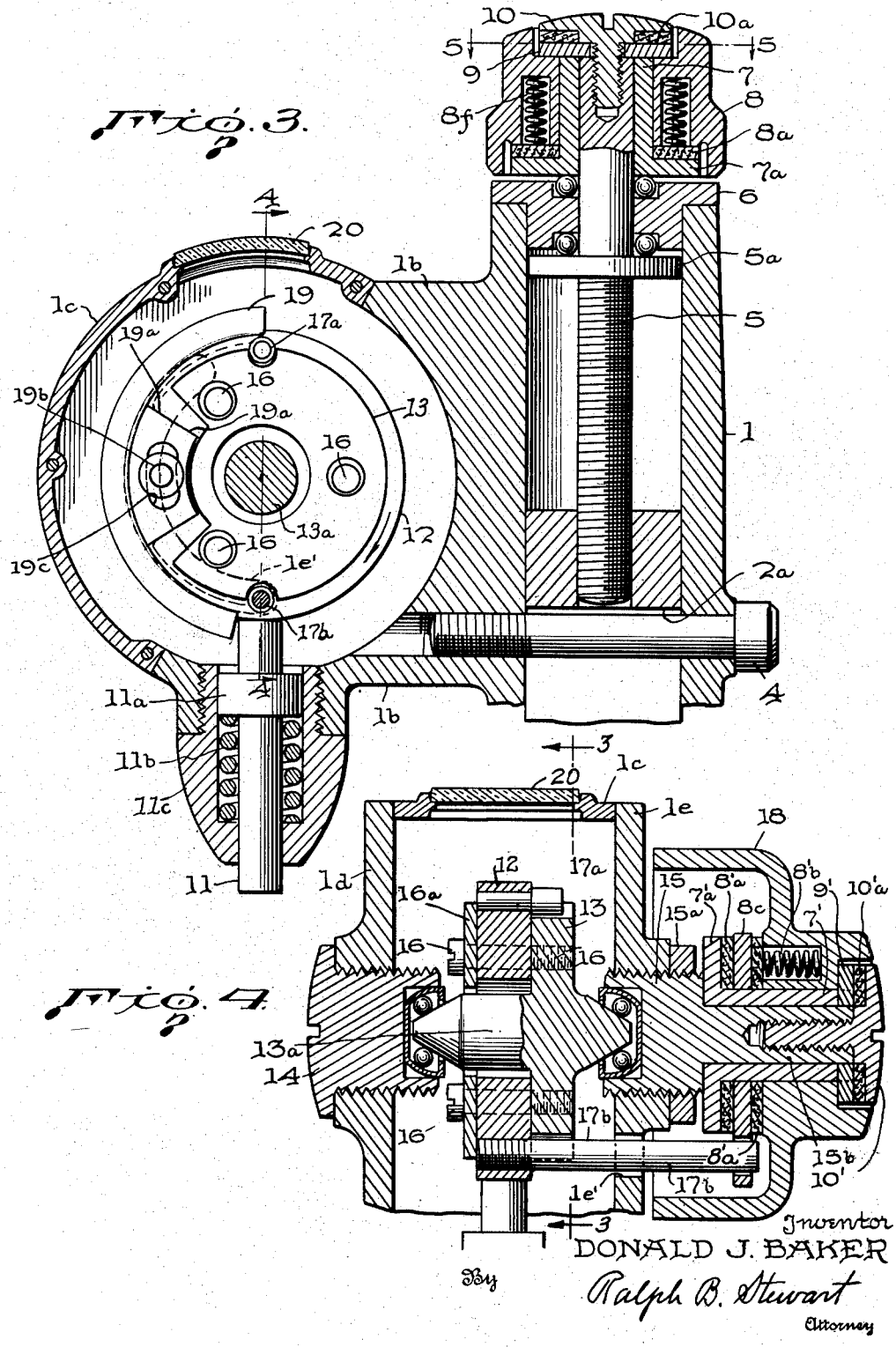

Patented May 13, 1952

2,596,519

UNITED STATES PATENT OFFICE 2,596,519

DISTANCE COMPARATOR GAUGE

Donald J. Baker, Los Angeles, Calif.

Application September 28, 1944, Serial No. 556,212

7 Claims. (Cl. 33—147)

This invention relates to measuring gauges and in particular to gauges having opposed contacts for measuring distance.

My invention is especially useful in the type of gauge employed for testing the dimensions of an object for the purpose of determining whether or not the dimension is larger or smaller than a desired amount.

An object of the invention is to produce a measuring gauge of simple and rugged construction but having high sensitivity.

A further object of the invention is to devise a measuring gauge in which the sensitivity of the gauge may be varied.

Still another object is to provide a measuring gauge capable of covering a wide range of measurements with equal sensitivity throughout the range.

The preferred form of my invention is illustrated in the accompanying drawing in which Figure 1 is a side elevational view of the gauge;

Figure 1a is a plan view of a portion of Figure 1 showing the viewing window and indicating scale of the gauge;

Figure 2 is a front elevational view of the gauge;

Figure 3 is a sectional view on an enlarged scale of the upper part of Figure 1 taken along a vertical plane at 3—3 in Figure 4;

Figure 4 is a sectional view of Figure 3 taken along the line 4—4; and

Figure 5 is a sectional view of Figure 3 taken along line 5—5.

Referring to the drawing, 1 indicates the main casing or frame of the gauge which is formed as an elongated sleeve which is split along part of its length as shown at 1a. 2 indicates an adjustable rod positioned within the sleeve 1 and having a bracket 3 mounted on the lower end thereof which carries one of the opposed contacts 3a which may be termed the anvil. The upper end of the rod 2 has a slot 2a formed therein, see Figure 3, for receiving a threaded bolt 4 which extends through a hole formed in the rear wall of sleeve 1 and has threaded engagement with the opposite wall of the sleeve. This construction permits the rod 2 to be adjusted axially within sleeve 1 and to be clamped in any adjusted position.

For the purpose of producing axial adjustment of the rod 2 in the sleeve 1 a screw 5 is mounted in the upper end of the sleeve 1 and has threaded engagement with the upper end of rod 2 above bolt 4. Screw 5 is provided with a circular flange 5a intermediate the ends thereof and the upper portion of the screw shank is journaled in a disk 6 seated in the upper end of sleeve 1. Suitable ball bearings are interposed between flange 5a and disk 6 and are positioned within an annular groove or race formed in the lower face of the disk as shown in Figure 3. A similar ball bearing is provided in an annular groove or race formed in the upper face of disk 6.

The upper end of screw 5 is provided with an adjusting knob embodying a friction clutch construction. This includes a sleeve 7 surrounding the upper end of screw 5 and having a radial flange 7a at the lower end thereof, the lower face of which engages the ball bearing carried by the upper face of disk 6. The adjusting knob 8 is mounted on sleeve 7, and a fiber washer 8a is interposed between the flange 7a of sleeve 7 and the radial face of a counter-bore in the lower end of the knob. Suitable compression springs 8f are provided in counter-bores formed in knob 8 for pressing washer 8a into contact with the flange 7a. The upper end of sleeve 7 is provided with a transverse slot which receives two tongues 9a and 9b of a lock washer 9 surrounding the upper end of sleeve 7, see Figure 5. The two tongues 9a and 9b also extend into a transverse slot formed in the upper end of screw 5, and the lock washer is held in position by screw 10 having threaded engagement with the upper end of the stem of screw 5. A washer 10a of resilient material is interposed between the head of the screw 10 and lock washer 9. The arrangement of the lock washer 9 is more clearly illustrated in Figure 5, and the purpose of this construction is to secure the sleeve 7 to the shank of screw 5 and to prevent rotation of the sleeve with respect to the screw. As shown in Figure 3, washer 9 also engages the radial wall of a counter-bore formed in the upper end of knob 8 and holds the knob in position on sleeve 7. It will be understood that due to the friction between washer 8a and flange 7a, the screw 5 may be rotated by operating knob 8, but as soon as the resistance to turning reaches a certain value, the washer 8a will slip on flange 7a and the screw 5 will not turn.

Sleeve 1 is provided with a boss 1b extending to the left thereof as shown in Figs. 1 and 3 for supporting the movable contact or plunger 11 which cooperates with the anvil 3a. The plunger 11 is supported in a mounting sleeve 11c having threaded connection with the boss 1b. Plunger 11 is provided with a radial flange 11a near the upper end thereof and a coiled spring 11b surrounds the lower end of the plunger and seated on a shoulder in sleeve 11c acts against the lower face of the flange 11a tending to move the plunger 11 away from the anvil 3a.

The arrangement for operating plunger 11 is contained within an extension housing carried by boss 1b. The inner space of the extension housing is cylindrical in form, one-half of the cylindrical wall being formed in the boss 1b, while the other half of the cylindrical wall is formed by a removable wall portion 1c, see Figure 3. A pair of circular end walls 1d and 1e complete the extension housing, see Figures 2 and 4. The arrangement for operating plunger 11 embodies a circular cam 12 which is mounted for rotation within the extension housing, the outer edge of the cam serving as an adjustable stop for plunger 11. The arrangement for mounting the cam 12 is illustrated in detail in Figure 4. The cam is mounted for rotation about an axis which is eccentric with respect to its own axis, the mounting arrangement permitting adjustment of the amount of eccentricity. As shown in Figure 4, cam 12 is adjustably clamped to one face of mounting disk 13 which has a supporting shaft 13a, one end of which is pivotally supported in suitable ball bearings mounted in the end of a threaded plug 14 carried by end-wall 1d, and the opposite end is pivotally mounted in suitable ball bearings carried by the inner end of plug 15 mounted in end-wall 1e. For the purpose of avoiding any play or lost motion in cam 12, I prefer to support shaft 13a by pivot or conical bearings of the type shown in the drawing, but other constructions may be employed. Plug 15 is adjusted to remove all play in the bearings and is then locked in position by lock nut 15a. Cam 12 has a central opening formed at the center thereof which receives the mounted shaft 13a with considerable clearance as shown in Figures 3 and 4. The cam 12 is clamped to the disk 13 by suitable mounting screws 16 (Figure 3) which extend from mounting disk 13 and engage a clamp ring 16a on the other side of cam 12. The clamping screws 16 pass through holes formed in cam 12 which provide considerable clearance around the clamping screws as shown in Figure 3. This permits adjustment of the amount of eccentricity between the center of cam 12 and the axis of rotation of disk 13. A pair of guide pins 17a and 17b are secured to the cam 12 at diametrically opposite points. The pins extend parallel with the axis of disk 13 and are positioned within radial slots formed in the outer edge of disk 13 to prevent relative displacement of cam 12 with respect to the disk 13 at right angles to the plane of the two pins but permitting adjustment of the cam with respect to the disk in a direction parallel with the plane of the two pins. As will be seen in Figure 4, pin 17b extends through slot 1e' formed in end wall 1e and is connected to a friction clutch embodied in an operating knob to be described hereinafter. The slot 1e' is arcuate in shape as shown in dotted lines in Figure 3 to permit rotation of cam 12 substantially through one-half revolution. The cam rotates in a clockwise direction from the position as shown in Figure 3. Pin 17b may be a short pin like 17a, and a separate pin or arm may be secured to the disk 13 for rotating cam 12 from the friction clutch.

The arrangement for operating the cam is shown in detail in Figure 4. The threaded plug 15 is provided with a reduced stem 15b on which is supported an operating knob 18 which embodies a friction clutch construction somewhat like that shown in Figure 3 but having a somewhat different mode of operation. This arrangement includes a sleeve 7' surrounding stem 15b and having a radial flange 7'a. The clutch also embodies a lock washer 9' having inwardly extending tongues which are positioned in a slot formed in the end of the sleeve 7' in the same manner as in Figure 3, but the tongues are not locked to stem 15b. Washer 9' is held in position by screw 10' with a fiber washer 10'a interposed, but the screw 10' does not clamp the sleeve 7' to stem 15b, the sleeve 7' being free to rotate on the stem. In the construction of Figure 4 a pair of fiber washers 8'a are interposed between the knob 18 and the flange 7'a and a clutch plate 8c is interposed between these two fiber washers. Clutch plate 8c has an extension with a hole which receives the pin 17b secured to cam 12 and extending through the arcuate slot 1e'. A series of compression springs 8'b serve to clamp the clutch plate 8c between the two fiber washers 8'a. It will be understood that rotation of knob 18 causes rotation of clutch disk 8c through frictional contact with disks 8'a, whereby cam 12 is rotated by pin 17b. If resistance to movement of the pin 17b exceeds a certain limit, the clutch begins to slip and cam 12 will not rotate.

For the purpose of indicating the amount of rotation of the cam 12, a graduated scale 19 of arcuate shape is mounted to move with the cam, and the preferred arrangement is to mount the scale to cover a portion of the peripheral edge of cam 12 as shown in Figure 3, but the scale may be mounted on disk 13 if desired. The scale is secured in position by means of a radial flange 19a which extends into a radial slot formed in disk 13 and is clamped to one face of the cam 12 by means of a screw 19b passing through an elongated aperture 19c formed in the flange 19a. Elongated slot 19c permits adjustment of the scale around the cam 12 to a limited extent. The removable wall portion 1c of the eccentric housing is provided with a viewing window 20 at the upper portion thereof for the purpose of viewing the scale 19. The window is covered by a transparent panel such as glass or other material having an index line 20a formed thereon as shown in Figure 1a. The scale 19 is preferably provided with double graduations beginning with the zero at the center and extending in opposite directions. One set of graduations is printed in red while the other may be printed in a contrasting color such as black or blue. Instead of having graduations on the scale, it may have a center line with the word "Go" printed on one side and the word "No-go" printed on the other side.

It will be understood that the cam disk 12 is formed of hardened steel or other suitable material, and the peripheral face thereof is accurately ground to circular shape over the portion which serves as a stop for the plunger 11, that is, it is ground to have a constant radius over the working range of the peripheral edge. The cam 12 is mounted on disk 13 so that it is eccentric with respect to the rotary axis of the mounting disk 13, and the sensitivity of the gauge is dependent upon the amount of eccentricity. That is, if the gauge is to indicate small differences in a dimension, then the eccentricity should be small, whereas if the gauge is to allow for a considerable variation in dimension, the eccentricity may be larger. If the cam disk 12 is displaced one-thousandth of an inch with respect to the axis of disk 13, plunger 11 will be moved through two-thousandths of an inch when disk 12 is rotated through 180°. Accordingly, the graduations on scale 19 can be laid out to represent movements equal to twice the amount of eccentricity of disk 12 with respect to disk 13. With a displacement of one-thousandth of an inch, the two extreme positions of the scale 19 would represent a difference in measurement of two one-thousandths of an inch, and the two end portions of the scale may be subdivided into ten divisions so that each division would represent one ten-thousandth of an inch.

In the use of my gauge, it is first set for testing of a definite distance or dimension by placing a standard gauge block of the correct dimension between the anvil 3a and the plunger 11. Cam 12 is then moved until the scale 19 is in the zero position; bolt 4 is then loosened and knob 8 is adjusted to clamp the gauge block between the two contact members. As soon as the friction clutch in knob 8 begins to slip, bolt 4 is tightened and the gauge is properly set for use. In using the gauge for checking the dimensions of articles, cam 12 is rotated in a direction to separate the contacts to the greatest extent possible, the article is inserted between the contacts and cam 12 is then rotated to bring plunger 11 into engagement with the article. The position at which the cam 12 stops, after the friction clutch in knob 18 begins to slip, will be indicated by dial 19 and will provide an indication of the dimension of the article by comparison with the standard gauge block.

The gauge as described above may be held in the hand during use, or if desired, it may be used as a bench gauge by providing a suitable base 22 which is removably secured to the gauge by a suitable screw 22a, see Figure 1. By forming the anvil 3a so that it is removable from its socket, anvils of different lengths may be inserted and thereby greatly extend the range of usefulness of the gauge for a given length of slot 2a in rod 2, or the same result may be obtained by providing a series of anvil supporting rods of different lengths which may be substituted for the rod 2 as required. For the purpose of measuring threaded rods or shafts, the anvil and plunger may be provided with jaws having thread engaging points or teeth formed on the opposing faces thereof, for the accurate measurement of threaded pieces without unnecessary wear on the threads of the pieces being measured, thus providing a non-wearing "Go" and "No-go" thread gauge.

It will be obvious that the construction shown and described herein may be varied in many ways without departing from the principle of the invention.

I claim:

1. In a measuring gauge, the combination of a housing, a disk rotatably supported within said housing and having a flat side face normal to its axis of rotation, a circular cam adjustably secured to said flat face of said disk, a movable plunger carried by said housing and positioned to move radially of said cam, biasing means for urging said plunger into engagement with the peripheral edge of said cam, a rotary knob mounted on the outside of said housing in axial alignment with said rotary disk, and connecting means passing from said rotary knob through an arcuate slot formed in said housing at a fixed distance from the axis of said disk and serving to rotate said cam by said knob.

2. A combination according to claim 1 wherein said knob embodies a friction clutch interposed in the driving connection between said knob and said cam.

3. In a measuring gauge, the combination of a movable plunger forming a contact element, biasing means for moving said plunger in one direction, a circular cam positioned so the edge thereof serves as a stop for said plunger, means mounting said cam for rotation about an axis eccentric with the axis of the cam, means for limiting rotation of said cam to an angle of approximately 180°, whereby only one-half of the peripheral edge of said cam cooperates with said plunger, and dial means carried on the peripheral edge of the remaining portion of said cam.

4. A measuring gauge according to claim 3 wherein said dial means comprises an arcuate dial member covering the peripheral edge of that portion of said cam which does not cooperate with said plunger, said dial member having graduations formed on the outer face thereof.

5. In a measuring gauge, the combination of a housing, a circular cam mounted for rotation within said housing, a movable plunger carried by said housing and positioned to move radially of said cam, biasing means for urging said plunger into engagement with the peripheral edge of said cam, means for limiting rotation of said cam to approximately 180° whereby only one-half of said cam cooperates with said plunger, dial means carried on the peripheral edge of said cam which does not cooperate with said plunger, and a viewing window formed in said housing opposite the path of movement of said dial means.

6. In a measuring gauge, the combination of a housing, a pair of bearing screws mounted in threaded openings in opposite walls of said housing, a stub-shaft mounted in said housing and having the ends thereof journaled on the ends of said bearing screws, a circular cam mounted on said shaft in eccentric relation therewith, an adjusting knob rotatably mounted on one of said bearing screws outside of said housing, and a rigid driving member extending from said knob through an arcuate slot in said housing to effect rotation of said cam by said knob.

7. A measuring gauge according to claim 6 and including a friction clutch embodied in said knob and forming the driving connection between said knob and said driving member.

DONALD J. BAKER.

REFERENCES CITED

The following references are of record in the file of this patent:

UNITED STATES PATENTS

| Number | Name | Date |
| --- | --- | --- |
| 242,100 | Barnes | May 31, 1881 |
| 572,041 | Willcox et al. | Nov. 24, 1896 |
| 697,400 | Fawcett | Apr. 8, 1902 |
| 839,943 | Marsh | June 1, 1907 |
| 1,414,484 | Olsen | May 2, 1922 |
| 1,499,729 | Hanson | July 1, 1924 |
| 1,786,325 | Young | Dec. 23, 1930 |
| 2,015,986 | Aldeborgh et al. | Oct. 1, 1935 |
| 2,135,316 | Whistler et al. | Nov. 1, 1938 |
| 2,230,485 | Dowdy et al. | Feb. 4, 1941 |

FOREIGN PATENTS

| Number | Country | Date |
| --- | --- | --- |
| 81,142 | Switzerland | May 16, 1919 |
| 604,660 | Germany | Oct. 25, 1934 |